United States Patent

Bratt et al.

[15] 3,642,467
[45] Feb. 15, 1972

[54] TREATMENT OF MATERIALS CONTAINING LEAD SULPHIDE

[72] Inventors: Geoffrey Charles Bratt, Moonah, Tasmania; Roderick James Sinclair, Mont Albert, Victoria, both of Australia

[73] Assignee: Electrolytic Zinc Company of Australasia Limited, Melbourne, Victoria, Australia

[22] Filed: Feb. 13, 1969

[21] Appl. No.: 799,081

[30] Foreign Application Priority Data

Feb. 29, 1968   Australia ..............................34388/68

[52] U.S. Cl. ....................................75/101, 75/103, 75/104, 75/115, 75/120, 23/127
[51] Int. Cl. ......................................................C22b 13/04
[58] Field of Search....................75/101, 103, 104, 120, 115;

23/127

[56] References Cited

UNITED STATES PATENTS

| | | | |
|---|---|---|---|
| 2,950,964 | 8/1960 | Forward et al. | 75/103 |
| 3,241,951 | 3/1966 | Forward et al. | 75/120 |
| 3,440,155 | 4/1969 | Pickering et al. | 75/120 X |

*Primary Examiner*—Hyland Bizot
*Assistant Examiner*—G. T. Ozaki
*Attorney*—Pierce, Scheffler & Parker

[57] ABSTRACT

A process for recovery of lead values from a material containing lead sulphide and an iron compound by treatment with sulphuric acid in the presence of oxygen and a compound containing Na, K and/or $NH_4$.

1 Claim, No Drawings ial solution. After treatment in the autoclave the pulp was
TREATMENT OF MATERIALS CONTAINING LEAD SULPHIDE This invention relates to improvements in or relating to a process for treating materials containing lead sulphide, such as lead sulphide mineral concentrates, mixed lead sulphide/zinc sulphide concentrates, mixed lead sulphide/zinc sulphide/iron sulphide concentrates or lead sulphide/copper sulphide/iron sulphide concentrates.

Methods are known for treating lead-bearing mineral sulphides for the recovery of the metal values contained therein which involve as part of the overall process the oxidation of the sulphides suspended in an aqueous medium to form sulphates.

It is known that lead values contained as sulphide in the lead-bearing material can be converted to sulphate form by dispersing finely divided particles of the lead-bearing material in an aqueous sulphuric acid solution and reacting the resultant slurry with a free oxygen containing gas, such as air, oxygen-enriched air, or oxygen. Such lead values can also be converted to sulphate form by treatment with an aqueous acidic ferric sulphate solution. In both cases lead sulphide converts to lead sulphate which is insoluble in the solution and remains with the undissolved residue. The lead sulphate may be subsequently leached from the residue with a solvent which extracts the precipitated lead values, such as an alkylene amine solution, a brine solution, or an ammoniacal ammonium sulphate solution in accordance with U.S. Pat. No. 3,440,155 owned by the assignee of the present application.

However when the mineral sulphide undergoing oxidative treatment contains iron compounds, as is the case with most lead sulphide concentrates, or when the oxidative treatment involves the deliberate addition of an iron compound, a proportion of the lead values forms a compound containing iron, lead, sulphur and oxygen, which is not amenable to subsequent dissolution in reagents such as those mentioned above. The effectiveness of the process is thereby reduced and the subsequent extraction of the lead values rendered less efficient, with a substantial amount of lead left undissolved in the residue.

It has not surprisingly been found that if the oxidation reaction is carried out in the presence of certain added cations the efficiency of subsequent lead extraction in a system as hereinabove described is substantially improved.

According to the present invention, therefore, a process for the recovery of lead values from a material containing lead sulphide in the presence of iron or a compound of iron which includes the step of subjecting the said material to oxidative treatment in an aqueous medium is characterized in that there is added to the said aqueous medium one or more of the cations selected from the group consisting of sodium-potassium, ammonium, rubidium, caesium, silver, calcium, strontium and barium.

Preferably the cation used comprises sodium, potassium or ammonium, or mixtures of these, most preferably sodium or potassium, or mixtures of these. The anion associated with the selection cation appears to be of little importance provided the compound is soluble in or reacts with the aqueous medium and does not interfere with the effectiveness of any subsequent operation. Thus suitable compounds that may be added as a source of the cation(s) may be the sulphates, sulphides, carbonates, hydroxides or oxides.

The compound or compounds may suitably be added to the aqueous oxidation medium in an amount sufficient to produce an added cation concentration of between 2 g./l. and 100 g./l., preferably between 5 and 70 g./l. However, the compounds are effective over a very wide range of concentrations, and the amount of added cation used will depend on an economic balance between the cost of the additions and the value of the extra lead recovered.

Preferably the oxidative treatment comprises the treatment of the material containing lead sulphide with aqueous sulphuric acid solution and a free oxygen-containing gas. Alternatively, the said material may be treated with an aqueous acidic ferric sulphate solution.

However, other similar known forms of oxidative treatment can also be used in the process of the invention.

In a preferred embodiment of the process according to the invention, lead sulphide or material containing lead sulphide, preferably of a particle size less than 150 microns, is dispersed in an aqueous sulphuric acid solution which contains free acid in amounts at least sufficient to combine with the zinc and lead values contained in the treated material and preferably from 5 to 10 percent by weight excess and which contains potassium ions in the concentration range 2 to 20 g./l. The resulting slurry, which may contain 20 to 50 percent by weight of solids is reacted at an elevated temperature preferably between 80° and 130° C. more preferably between 90° and 115° C., with a free oxygen containing gas, for example air, preferably under a partial pressure of oxygen of from 0.15 to 15 atmospheres (absolute).

The following examples illustrate the operation of the present invention.

EXAMPLE 1

EFFECT OF POTASSIUM CONCENTRATION ON LEAD EXTRACTIBILITY

A complex lead/zinc/iron sulphide concentrate of composition in weight percent Zn 29.5; Pb 9.5; Fe 14.0; Cu 0.65; and total sulphide 29.05 was treated in a 1-liter batch autoclave as a suspension (pulp density 22.8 percent) in an aqueous solution of sulphuric acid ($H_2SO_4$ 99 g./l.) at a temperature of 115° C. and a total pressure of 90 p.s.i.g., including a partial pressure of oxygen of about 80 p.s.i.g. for a period of 2 hours. Various amounts of potassium sulphate were added to the initial solution. After treatment in the autoclave the pulp was removed and separated into a residue and liquor by filtration and washing. Analysis of the liquor permitted the determination of the zinc extraction. Extraction of the residue with a 10 percent by weight ammonium acetate solution and analysis of the extractant liquor enable an estimation of the lead extractibility (as a percentage by weight is intended here and hereafter as a specification) in either ammoniacal ammonium sulphate solution or alkylene amine solution.

The results obtained are tabulated below.

| Test No. | Initial K⁺ concn. | Extractibility of lead % |
| --- | --- | --- |
| 1 | nil | 57.6 |
| 2 | 6.8 | 82.7 |
| 3 | 13.6 | 82.7 |
| 4 | 20.3 | 86.3 |
| 5 | 96 (1) | 95.0 |
| 6 | 5.0 (2) | 79.2 |

(1) Amounts of $K_2SO_4$ added equivalent to this concentration but it was not all soluble in the liquor under the test conditions.

(2) Solution initially contained 49 g./l. zinc, but no significant effect has been observed over a wide range of zinc concentrations.

In test Nos. 2, 3 and 4 the potassium concentration of the oxidation liquor decreased by 1 g./l. during the oxidation. As a result the lead extractibility was increased from 57.6 percent (Test No. 1) to 86.3 (Test No. 4). For the conditions of these tests this increased lead extractibility amounted to 6.22 g./l. of lead. Thus for an increased lead extraction of one long ton the potassium consumed would be 360 lbs.

EXAMPLE 2

EFFECT OF SODIUM CONCENTRATION ON LEAD EXTRACTIBILITY

The same mineral concentrate as was used in Example 1 was treated under the same conditions as Example 1 except that the solution used had an initial composition of Zn 66 g./l., $H_2SO_4$ 92 g./l. The sodium sulphate level in the initial liquor was progressively increased and the results obtained are tabulated below.

| Test No. | Initial Na⁺ Concn. g./l. | Extractibility of Lead % |
| --- | --- | --- |
| 1 | nil | 57.6 |
| 2 | 15 | 81.8 |
| 3 | 23 | 78.6 |
| 4 | 29 | 78.6 |
| 5 | 35 | 75.7 |
| 6 | 39 | 74.4 |
| 7 | 46 | 86.3 |
| 8 | 57.5 | 94.9 |

EXAMPLE 3

EFFECT OF AMMONIUM CONCENTRATION ON LEAD EXTRACTIBILITY

The same concentrate as was used in Example 1 was treated under the same conditions as in Example 1 except that the initial solution contained 66 g./l. Zn, 102 g./l. $H_2SO_4$. The ammonium sulphate concentration in the initial liquor was progressively increased and the results obtained are tabulated below.

| Test No. | initial $NH_4^+$ concn. g./l. | Extractibility of lead % |
| --- | --- | --- |
| 1 | nil | 57.6 |
| 2 | 36 | 94.0 |
| 3 | 72 | 96.0 |
| 4 | 108 | 96.0 |
| 5 | 144 | 94.0 |
| 6 | 180 | 92.7 |
| 7 | 198 | 94.8 |

EXAMPLE 4

EFFECT OF MIXTURES OF ADDED CATIONS

The same concentration as was used in Example 1 was treated under the same conditions as in Example 1 except that the initial solution contained 66 g./l. Zn, 91 g./l. $H_2SO_4$. Mixtures of sulphates of ammonium, sodium and potassium were added to the initial liquor and the results obtained are tabulated below.

| Test No. | Initial Concns. | | | Extractibility of lead % |
| --- | --- | --- | --- | --- |
| | K | $NH_4$ | Na | |
| 1 | nil | nil | nil | 57.6 |
| 2 | 5 | 6 | — | 85.6 |
| 3 | 13 | — | 23 | 87.8 |
| 4 | — | 9 | 23 | 86.5 |

We claim:
1. In a process for the recovery of lead values from a material containing lead sulphide in the presence of an iron compound which process comprises treatment of the material with aqueous sulphuric acid solution which contains free sulfuric acid in amounts sufficient to combine with the lead and zinc values contained in the treated material at a temperature of at least 80° C. and under a positive partial pressure of oxygen which process normally leads to the formation of a mixture of lead sulphate and basic lead iron compounds the improvement which comprises carrying out the said treatment, in the presence of the sulphate of at least one cation selected from the group consisting of sodium, potassium and ammonium and in sufficient quantity to obtain a concentration of the selected cation of from 2 g./l. to 100 g./l. such that the formation of basic lead iron compounds is substantially prevented.

* * * * *